UNITED STATES PATENT OFFICE.

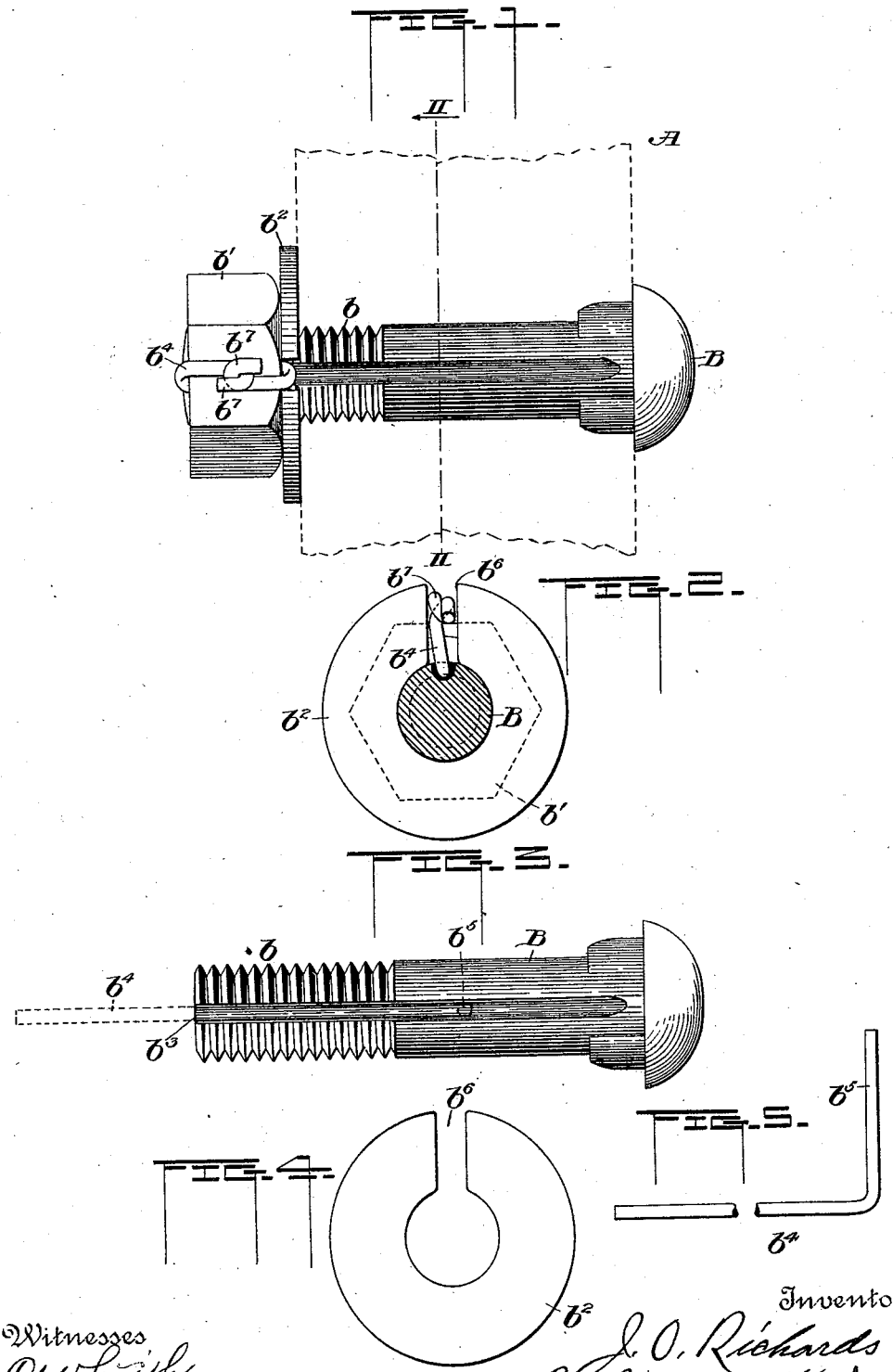

JOHN O. RICHARDS, OF COVINGTON, KENTUCKY.

NUT-LOCK.

SPECIFICATION forming part of Letters Patent No. 557,230, dated March 31, 1896.

Application filed January 24, 1896. Serial No. 576,708. (No model.)

*To all whom it may concern:*

Be it known that I, JOHN O. RICHARDS, a citizen of the United States, residing at Covington, in the county of Kenton and State of Kentucky, have invented certain new and useful Improvements in Nut-Locks; and I do hereby declare the following to be a full, clear, and exact description of the invention, such as will enable others skilled in the art to which it appertains to make and use the same.

This invention relates to nut-locks, but more particularly to those employed for railroad purposes.

Heretofore in the construction of nut-locks it has been proposed to provide a bolt having a longitudinally-extending groove, and a washer provided with an annular recess in which the end of an angular key is adapted to fit, so that the body portion thereof may be supported in the groove in the bolt and have its outer end bent so as to engage slots in the nut; or said key or fastening device has one of its ends adapted to be held in a recess or otherwise secured to the bolt after passing through the longitudinal groove therein, and has its outer end bent so as to engage the face or periphery of the nut in order to prevent movement thereof; but such constructions have ordinarily proved impracticable on account of being difficult and expensive to manufacture, by reason of the recesses and slots formed in the nuts, bolts, or washers for securing the ends of the fastening device, which recesses or slots are often of peculiar form and arrangement, requiring several operations to complete the same, and, furthermore, such devices often fail to secure the object sought, for the reason that if the key or fastening device should be broken at one or more points the nut will no longer be held thereby upon the bolt.

The primary object of my invention is to overcome these objectionable features by providing a lock for bolts which will positively hold the nut on the bolt, so as to prevent movement thereof by jar or otherwise after the nut is properly screwed thereon, and to provide means whereby the nut may be rigidly held from movement should the locking device or wire be broken at one or more points.

A further object of the invention is to provide a simple and inexpensive device, and to provide means to prevent pressure upon the wire or other fastening device between the inner surface of the nut and the object or article to be secured, so that the tendency to injure or destroy the efficiency of said fastening device may be reduced to a minimum and a perfect binding-surface be obtained between said nut and object.

The invention will be hereinafter more particularly described with reference to the accompanying drawings, forming a part of this specification, and will then be pointed out in the claims at the end of the description.

In the drawings, Figure 1 is an elevation of the bolt, nut, and locking device therefor, illustrating the position of the several parts when in use. Fig. 2 is a sectional view on the line II II of Fig. 1. Fig. 3 is a detail elevation of the bolt, the fastening device being shown in dotted lines in position before placing the nut thereon. Fig. 4 is a detail of the washer; and Fig. 5 is a detail view of the wire or fastening device before the same is bent, so as to prevent movement of the nut when screwed upon the bolt.

Referring to the drawings, A may indicate any suitable object or article through which the bolt B may pass to secure the several parts together. This bolt may be of any suitable form and is preferably provided with lugs or projections adjacent to its head, so as to prevent rotation thereof when in use, and has a screw-threaded end $b$, upon which a suitable nut $b'$ and a washer $b^2$, having the usual aperture, may be arranged in order to rigidly bind the object between said washer and the head of the bolt in the usual manner.

To prevent the nut from rotating or becoming loose upon the bolt, I preferably provide a groove $b^3$, extending longitudinally of said bolt, in which a wire, key, or other suitable fastening device $b^4$ may be passed, the groove being of sufficient depth to permit the rotation of the nut $b'$ without injury to the threads thereof. This fastening device or wire $b^4$ is preferably made angular by bending before being bent to hold the nut on the bolt, Fig. 5, and has its inner end or angular portion $b^5$ passed through an opening or slot $b^6$, which extends from the central aperture to the periphery of the washer $b^2$, so that said angular portion will not abut or be jammed between the inner surface of the nut and the object through which the bolt is passed and thereby injure said fastening device or prevent a proper binding-surface between the nut and the object to be secured. The ends of the fastening device may be bent over and upon the periphery or polygonal sides of the nut and interlocked by twisting or forming loops $b^7$, which rigidly hold the ends together, as shown in Fig. 1, though any other suitable means may be employed for holding or interlocking the ends of the fastening device, if desired.

The manner of using and constructing the invention will be readily understood from the foregoing description taken in connection with the accompanying drawings. The bolt being passed through the object or article to be secured, the fastening device, as shown in Fig. 5, may then be placed in the groove $b^3$, so that the angular portion $b^5$ abuts against said object, at which time the washer may be slipped over the screw-threaded end of the bolt, so as to cause the slot or opening $b^6$ of the washer to register with said angular portion of the fastening device. The nut $b'$ may now be screwed onto the bolt, so as to rigidly bind and hold the object, and the ends of the fastening device or wire $b^4$ bent over and upon the periphery of said nut, the ends being twisted or otherwise made to form the interlocking loops or ends $b^7$.

I thus provide an inexpensive and durable nut-lock which will rigidly hold and prevent movement of the nut, and which will require the unlocking and bending of the fastening device to the form shown in Fig. 5, or the breaking of said device at points adjacent to the forward edge of the bolt and the slot of the washer, respectively, before the efficiency of said fastening device or wire as a lock is entirely destroyed.

Instead of the ends of the fastening device being formed with interlocking loops, it will be understood that I may in some instances simply bend the ends of said fastening device over and upon the periphery or polygonal sides of the nut, and where the loops are used the same may be formed before the fastening device is placed in the groove of the bolt, so that the ends of said device may be bent over and sprung so as to cause said loops to interlock.

The fastening device may be of any suitable material and form, and the washer may be made of steel or other resilient material in order to assist in preventing movement of the nut.

Having thus fully described my invention, what I claim as new, and desire to secure by Letters Patent of the United States, is—

1. A nut-lock comprising a bolt provided with a groove extending longitudinally thereof, a nut, a washer having an aperture and an opening or slot therethrough extending from said aperture to the periphery of said washer, and an angular fastening device fitting the groove in said bolt and having the angular portion thereof passed through the slot in the washer; the ends of said fastening device being bent over and upon the periphery or polygonal sides of the nut, whereby said nut may be rigidly held on the bolt and a proper binding-surface provided between the nut and the object to be secured, substantially as described.

2. A nut-lock comprising a bolt provided with a groove extending longitudinally thereof, a nut, a washer having a central aperture and an opening or slot therethrough extending from said aperture to the periphery of said washer, and an angular wire fitting the groove in said bolt and having the angular portion thereof passed through the slot in the washer; the ends of said fastening device being bent over and upon the periphery or polygonal sides of the nut and twisted or bent so as to form interlocking loops, whereby said nut may be rigidly held on the bolt and a proper binding-surface provided between the nut and the object to be secured, substantially as described.

In testimony whereof I affix my signature in presence of two witnesses.

JOHN O. RICHARDS.

Witnesses:
J. E. BUCKLEY,
J. H. TEIPEL.